United States Patent Office 3,122,667
Patented Feb. 25, 1964

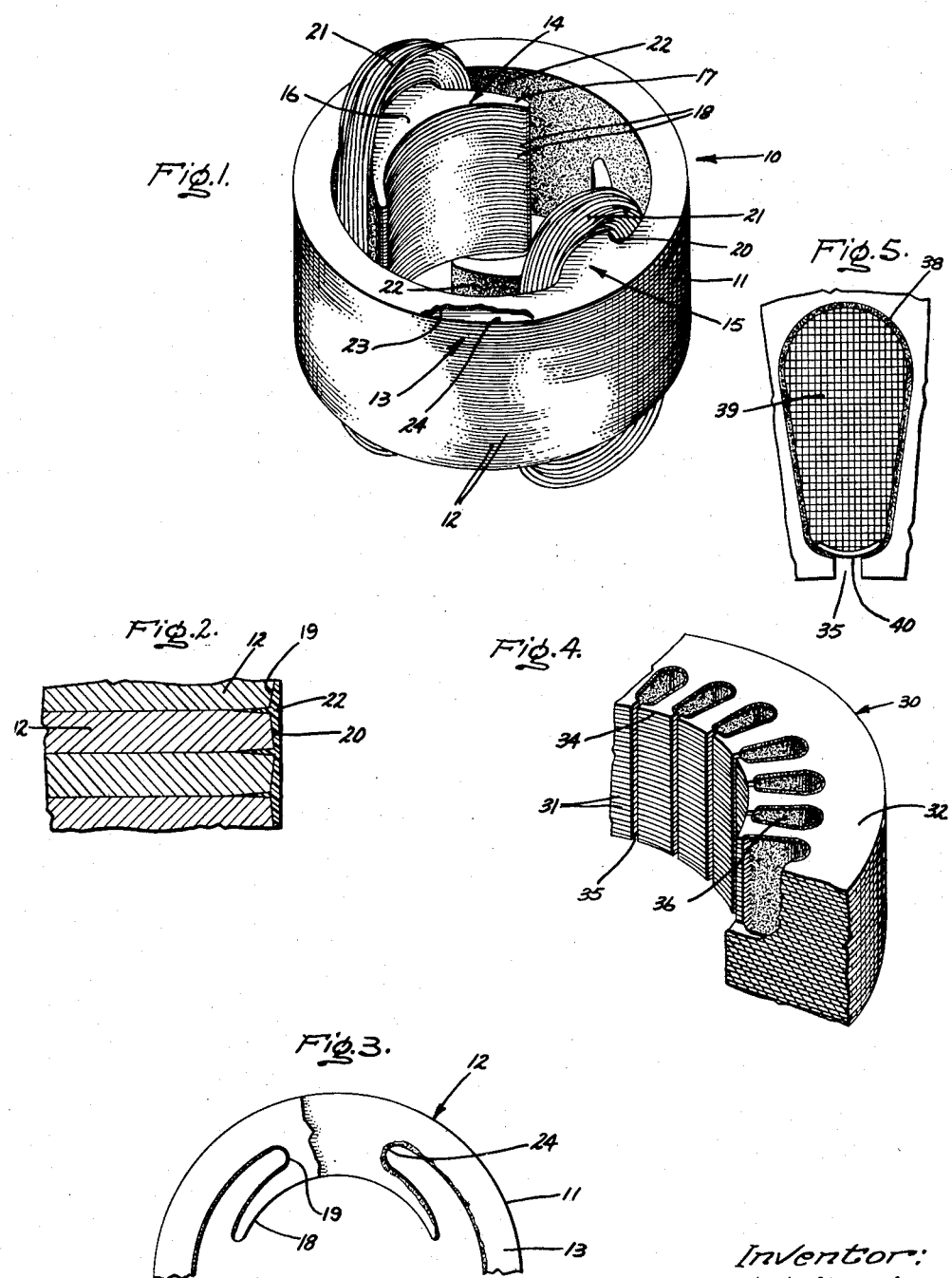

3,122,667
LAMINATED MAGNETIC CORE FOR USE IN AN ELECTRIC INDUCTIVE DEVICE
Nick Baciu, Fort Wayne, Ind., assignor to General Electric Company, a corporation of New York
Filed May 25, 1961, Ser. No. 112,617
4 Claims. (Cl. 310—45)

This invention relates generally to electric inductive devices and more particularly, to an improved laminated core construction employed in such devices.

Electric inductive devices, such as transformers and dynamoelectric machines, customarily include one or more core members. For example, dynamoelectric machines, i.e., motors and generators, conventionally include a stator core member and a rotor core member concentrically disposed within the stator core member. At least one and frequently both of the core members have a plurality of winding slots formed therein; in the case of a stator core member, the winding slots conventionally extend radially outward from the bore whereas in the case of a rotor member, the winding slots conventionally extend radially inward from the outer periphery. The core members are usually formed of a plurality of relatively thin laminations punched from magnetic steel and therefore generally have burrs or other sharp edges thereon.

Dynamoelectric machines, at least in the smaller frame sizes, conventionally have their windings, which are positioned in the winding slots, formed of enameled magnet wire, and therefore, if such windings were merely positioned in the slots without other insulation, the burrs and other sharp edges would tend to cause breaks in the enameled insulation on the wire and thus short circuits to the ground would result. For this reason, it has been conventional to employ separate fabricated insulators for the winding slots for dynamoelectric machine core members, such insulators formed of such materials as kraft paper, cellulose acetate, or the newer plastic films; these prior individual slot insulators were conventionally formed with cuff portions at the opposite ends of the slot in order to prevent the portion of the winding which extends beyond the slot, i.e., the end turns, from being shorted to the core at the exterior corners of the slot. Such individual slots and end insulators have been in themselves expensive and their installation has added appreciably to the over-all cost of the machines. Further, in spite of careful installation of such slot and end insulators and winding of the wire into the slots, short circuits to ground due to abrasion of the enameled wire have continued.

Also in the past, it has been necessary to assemble the laminated punchings into a unitary core by such means as, for example, riveting, bolting, clamping, or keying. Keys, rivets and the like, and keying machines, riveting machines, and the like likewise have added appreciably to the over-all cost of the finished machine.

Thus, it would be very desirable if a laminated core structure were provided with an arrangement which would hold the laminations united in rigid and strong permanent relation with each other without requiring rivets, keys and the like, and would at the same time insulate the walls of the slots.

It is therefore an object of this invention to provide an improved laminated core construction for electric inductive devices.

A further object of this invention is to provide an improved arrangement for uniting the laminations of an inductive core in a strong, rigid and permanent stacked relation.

Another object of the invention is to provide an improved arrangement for insulating the slots of a laminated stator core and for uniting the laminations into a strong rigid core.

In carrying out the objects of the present invention in one form thereof, I provide an improved core for an inductive device in which a plurality of laminations are stacked in face to face engaging relation with a number of axially aligned slots extending through the stack for accommodating windings. I dispose an adhesive insulating material on the slot walls in a generally continuous uniform hardened layer which penetrates a slight distance between adjacent laminations. This layer not only insulates the individual slot walls of the stack, but also provides the sole means for securing the laminations together into a compact, rigid core.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:
FIG. 1 is a view in perspective of a stator member of the salient pole type, for use in an electric motor, having a core embodying the invention in one form thereof;
FIG. 2 is an enlarged cross sectional view of a portion of the stator member of FIG. 1 to illustrate in detail the manner in which slot insulating material bonds the individual laminations together into a rigid compact stack;
FIG. 3 is a view, partly broken away, of a portion of the stator member illustrated in FIG. 1, with the windings removed, to show further details of the stator core;
FIG. 4 is a view in perspective of a part of a stator core in another form from that shown in FIG. 1; and
FIG. 5 is a fragmentary view of a portion of the stator core of FIG. 4, to illustrate how the sides of the winding coils are insulated from the core.

Referring now to FIGS. 1–3 of the drawing, for purposes of illustrating the preferred embodiment of the present invention, I have shown a two pole stator member, generally identified by numeral 10, of the salient pole type especially suitable for use in the construction of alternating current electric motors. Member 10 includes a laminated core 11 fabricated of a predetermined number of stacked laminations 12 which are assembled in face to face engaging relation. Each lamination may be conveniently stamped out of suitable magnetic sheet material, such as common iron, to provide an annular yoke section 13 and integral teeth or salient pole sections 14 and 15. The pole sections are each formed by a neck portion 16 projecting inwardly from section 13, and a dimensional wider tip portion 17 which terminates in an arcuate edge 18. As shown in FIG. 1, laminations 12 are stacked with the pole and yoke sections of the individual laminations aligned such that lamination edges 19 (FIG. 2) produce axial slots 20 which extend entirely through the stack and accommodate the sides of winding coils 21, wound with a preselected number of turns of enameled wire. Further, edges 18 of the respective aligned pole sections 14 and 15 together define a bore for receiving a rotor member (not shown).

In the preferred form of my invention, the laminations of the core are secured together in the face to face relation by a substantially uniform integral coating or layer 22 of an adhesive type electrical insulating material applied to the side walls of the winding slots 20 and may, for convenience of manufacturing procedures, cover the part of the pole tips located next to the sides of coils 21. This layer also acts as a means to insulate the coils from the core and eliminates the need for costly separate slot insulators or the like. If desired, the same type of insulating material may be applied in a generally uniform layer 23 over the exposed side faces 24 of the end laminations to complete the insulation of the coils from the magnetic core for those applications which require insulation at that location. Preferably, the adhesive insulating material of layer 22 is composed of a heat hardenable thermosetting resin composition or its equivalent, having good adhesive and cohesive characteristics, and is capable of penetrating between adjacent laminations a short distance from lamination edges 19.

The manner in which the adhesive insulating material cooperates with the laminations 12 to firmly secure them in face to face engaging relation is clearly shown in FIG. 2. It will be seen from an inspection of FIG. 2 that lamination edges 19 are slightly deformed or elongated as a result of, at least in part, the tearing or shearing action of the punching operation as the laminations are individually severed from the sheet stock, commonly having a thickness in the order of 0.01 to 0.03 inch. For the purpose of explanation, this deformation is illustrated in an exaggerated way. I have found that it is desirable to employ a substantially nonshrinking adhesive insulating material for layer 22, which prior to its application onto the slot walls, takes the form of a thixotropic hardenable coating fluid, capable of penetrating a slight distance between adjacent laminations (e.g., at least $3/32$ of an inch). Preferably, the hardenable fluid includes a liquid thermosetting epoxy resin having good adhesive, cohesive, and electric insulating characteristics, a thixotropic agent and inert inorganic filler, and pigment if so desired.

The fluid may be applied to the slot walls in any suitable manner, as for example, by my film drawing process disclosed and claimed in my Patent No. 2,978,371, assigned to the same assignee as the present invention. Briefly stated, the fluid may be readily applied to core 11 by initially introducing it on the slot walls in a state of plasticity, drawing it along the slot in a generally uniform layer, and finally curing the material to form a combined insulating and bonding hardened covering over the slot walls.

In actual practice, I have coated the slots of stator cores of various sizes, for example, having outer diameters in excess of three inches and stack lengths up to two inches, and have obtained excellent results with a coating fluid composed of the following ingredients: over 50% by weight of No. 815 epoxy resin and hardener from Shell Chemical Co., and the remainder (slightly less than 50% by weight) of Cab-O-Sil (sold by Godfrey L. Cabot, Inc. of Chicago, Ill.) with powdered mica, the thixotropic agent and filler. This latter material augments the dielectrical qualities of the epoxy resin and provides additional toughness and strength to the hardened coating. The resultant layer 22, although not more than 0.007 inch in average thickness, satisfactorily insulated the windings from the core and retained the laminations in a rigid stack.

It will be appreciated that by my invention, I am able to provide an extremely economical and simply constructed core for use in an inductive device. For example, I have eliminated the use of fabricated slot insulators and the expensive machinery needed to insert the insulators into the slots. Furthter, the core has the advantage of being produced in mass production quantities using low cost manufacturing techniques. In addition, the instant invention eliminates welds, rivets and the like, providing the maximum amount of magnetic material for the flux path through the yoke and teeth sections, and at the same time, by holding the laminations in face to face engaging relation, keeps the axial length of the core to a minimum.

It will be recognized by those skilled in the art that the instant invention, with its inherent advantages and features mentioned above, is not limited to the type of core shown in FIGS. 1–3 inclusive, but may take other structural forms. For example, the stator member, identified by numeral 30 in FIGS. 4 and 5, incorporates the preferred form of my invention and is particularly suitable for use in those motor applications where the motor output, core size and weight are all critical factors; e.g., missile applications. From FIGS. 4 and 5, it will be seen that the core is formed of a plurality of stacked laminations 31 in face to face engaging relation, each having a yoke section 32 of circular peripheral outline and a plurality of equally spaced apart teeth sections 33 terminating in tips 34. With the teeth assembled in axial alignment, the tips of the teeth together define a rotor receiving bore and a slot entrance 35 between adjacent tips 34. The sides of the teeth sections 33, along with the radially inner edge of the yoke section 32, provide a predetermined number of substantially identical oval-shaped winding slots 36 which extend axially through the core.

As in the stator member construction of FIGS. 1–3, a relatively thin layer of adhesive insulating material, indicated at 38 in FIGS. 4 and 5, covers the walls of each slot 36 to hold the laminations together in a rigid compact unitary core and to insulate the winding coils, shown at 39 in FIG. 5, from the core. The illustrated winding is of the distributed type and may be conventionally placed into the slots through slot entrance 35 after layer 38 has been hardened. Preferably, as best illustrated in FIG. 5, layer 38 extends up to but not into slot entrance 35 so that it will not interfere with the placement of coils 39 into the slots. A suitable inexpensive wedge 40 may be employed to close the entrance 35 and retain the coils within each slot 36.

Thus, the core of FIGS. 4 and 5, like that of stator member 10, will have the shortest possible axial length with a maximum utilization of magnetic material available or the flux path in both the yoke and teeth sections, thereby augmenting the magnetic efficiency of the motor. In addition, due to the relatively thin cross section area of layer 38, the layer does not appreciably diminish the winding carrying capacity of slots 36 and permits the winding to include a maximum number of turns of wire, further enhancing the ultimate output of the motor or other electric inductive device. Consequently, by my invention a light weight and extremely compact low cost core is provided which is capable of improved performance for any given core size.

It should be apparent to those skilled in the art, while I have shown and described what at present is considered to be the preferred embodiments of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. A core for an electric inductive device comprising a stack of laminations in face to face relation having means for accommodating windings, an adhesive insulating material disposed directly on the lamination surfaces of said means in a generally uniform layer for insulating the windings from said laminations, said adhesive insulating material being hardened and comprising the sole effective means securing said laminations rigidly together.

2. A core for an electric inductive device comprising a stack of laminations in face to face relation having a plurality of slots axially aligned through said stack for accommodating windings, an adhesive thermosetting epoxy resin insulating material disposed directly on the lamination surfaces of said slots in a generally uniform continuous hardened layer for insulating the windings from said laminations, said adhesive insulating material comprising the sole means securing said laminations rigidly together.

3. A stator core for use in an inductive device comprising a stack of laminations in face to face engaging relation having a plurality of slots axially through said stack for accommodating windings, and hardened adhesive insulating material disposed in a generally uniformed continuous layer directly on the slot walls and penetrating slightly between adjacent laminations, said layer insulating the windings from said laminations and securing said laminations together in a rigid unitary core.

4. A stator member for use in a dynamoelectric machine comprising a core of stacked laminations in face to face engaging relation, each lamination having a yoke section and a plurality of teeth sections extending inwardly from said yoke section, the teeth sections of said laminations being aligned to form with said yoke sections a plurality of axially extending slots, windings accommodated in said slots, and means for insulating said windings from said core and for securing said laminations rigidly together in a unitary core, said means including thixotropic adhesive insulating material disposed in a generally uniform continuous layer directly on the surfaces of the slots and penetrating slightly between adjacent laminations, said layer securing said laminations together in a unitary core and insulating the windings from said laminations.

References Cited in the file of this patent

UNITED STATES PATENTS

| | | |
|---|---|---|
| 2,057,503 | Sawyer | Oct. 13, 1936 |
| 2,318,095 | Puttman | May 4, 1943 |
| 2,465,296 | Swiss | Mar. 22, 1949 |
| 2,623,920 | Ford | Dec. 30, 1952 |
| 2,695,969 | Yates | Nov. 30, 1954 |
| 2,822,483 | Jean et al. | Feb. 4, 1958 |